United States Patent [19]
Reichardt et al.

[11] Patent Number: 6,000,969
[45] Date of Patent: Dec. 14, 1999

[54] CONTACT CARRIER INCLUDING AN INSULATING BODY AND CONTACTS POSITIONED THEREIN

[75] Inventors: Manfred Reichardt, Weinsberg; Gerhard Braun, Bitzfield, both of Germany

[73] Assignee: Amphenol-Tuchel Electronic GmbH, Heilbronn, Germany

[21] Appl. No.: 08/914,156

[22] Filed: Aug. 19, 1997

[30] Foreign Application Priority Data

Aug. 27, 1996 [DE] Germany .............. 196 34 565

[51] Int. Cl.⁶ .............................. H01R 23/70
[52] U.S. Cl. .................. 439/630; 439/629; 439/66; 439/862
[58] Field of Search ................... 439/630, 862, 439/660, 629, 260, 74, 83, 62, 66

[56] References Cited

U.S. PATENT DOCUMENTS

| | | | |
|---|---|---|---|
| 3,107,319 | 10/1963 | Vizzier, Sr. | |
| 3,701,071 | 10/1972 | Landman | 439/630 |
| 4,527,848 | 7/1985 | Velsher et al. | 439/62 |
| 4,717,817 | 1/1988 | Grassel et al. | 439/68 |
| 4,735,578 | 4/1988 | Reichardt et al. | 439/260 |
| 4,752,234 | 6/1988 | Reichardt et al. | 439/260 |
| 4,799,891 | 1/1989 | Reichardt et al. | 439/260 |
| 4,900,273 | 2/1990 | Pernet | 439/630 |
| 4,975,086 | 12/1990 | Reichardt et al. | 439/629 |
| 5,000,694 | 3/1991 | Komatsu | 439/260 |
| 5,013,255 | 5/1991 | Juret et al. | 439/630 |
| 5,259,769 | 11/1993 | Cruise et al. | 439/862 |
| 5,269,707 | 12/1993 | Reichardt et al. | 439/630 |
| 5,338,230 | 8/1994 | Bryce et al. | 439/629 |
| 5,338,231 | 8/1994 | Wilhite | 439/660 |
| 5,378,160 | 1/1995 | Yumibe et al. | 439/66 |
| 5,527,192 | 6/1996 | Juret | 439/862 |
| 5,586,890 | 12/1996 | Braun | 439/630 |
| 5,727,956 | 3/1998 | Mitra et al. | 439/74 |
| 5,746,607 | 5/1998 | Bricaud et al. | 439/630 |
| 5,746,626 | 5/1998 | Kwiat et al. | 439/630 |
| 5,752,841 | 5/1998 | Hori | 439/924.1 |
| 5,879,169 | 3/1999 | Wu | 439/74 |

FOREIGN PATENT DOCUMENTS

| | | |
|---|---|---|
| 0 274 534 | 7/1988 | European Pat. Off. . |
| 0 420 407 A1 | 4/1991 | European Pat. Off. . |
| 0 480 334 | 4/1992 | European Pat. Off. . |
| 40 30 196 A1 | 3/1992 | Germany . |
| 94 10 349 U | 10/1994 | Germany . |

*Primary Examiner*—Paula Bradley
*Assistant Examiner*—Tho D. Ta
*Attorney, Agent, or Firm*—Bacon & Thomas

[57] ABSTRACT

A contact carrier includes an insulating body and contacts positioned therein. Each contact has contact and connection ends projecting beyond the insulating body, and the connection ends of the contacts resting under prestress on corresponding portions of the insulating body, while forming coplanar contact surfaces.

10 Claims, 1 Drawing Sheet

CONTACT CARRIER INCLUDING AN INSULATING BODY AND CONTACTS POSITIONED THEREIN

BACKGROUND OF THE INVENTION

1. Field of the Invention

The invention concerns a contact carrier of an insulating body and contacts positioned therein, which may be arranged on a circuit board as a component of a contact device for a smart card reader, and the contacts of which can be contacted by corresponding contacts of an associated smart card (chip card) in a reading position of the smart card.

2. Description of Related Art

Usually, each contact has a contact end projecting beyond the insulating body and a connection end projecting beyond the insulating body. The connection ends are soldered to the corresponding contact strip of the circuit board—as can be gathered from the EP 0 480 334 A1. The connection ends can be inserted into the circuit board through corresponding openings. To attach the connection ends directly to the associated contact side of the circuit board is also possible.

SUMMARY OF THE INVENTION

In order to ensure a secure attachment and thus contacting of the contacts of the contact carrier with the corresponding contact strip on the circuit board, the invention provides an absolutely coplanar extension of the individual connection ends of the contacts. Even little tolerances in evenness (parallelism, rectangularity, obliquity, position) may result in that the soldered joints will not provide an one-hundred-percent contacting joint, particularly in an automatic placement in an SMD technology.

Accordingly, it is an object of the invention to provide a contact carrier of the said type, which provides its contact ends (connection ends) in an arrangement as exactly coplanar as possible.

To fix the contacts within the insulating body and to bend the contact ends (connection ends) around the outer surface of the contact carrier is known from U.S. Pat. No. 5,378,160 A. But with this type of fabrication of the contacts in the contact carrier, there is a risk that the desired coplanar arrangement is not achieved because of the springiness of the contacts.

In contrast, the invention provides in an contact carrier of the said type to apply under prestress the connection ends of the contacts to the corresponding portions of the insulating body, while forming coplanar contact surfaces.

Here, the prestress aspect is particularly important. While the prestress is overcome at least partially, the connection ends can thus be placed upon or put onto the associated portions of the insulating body so that the end portions of the contacts to be soldered to the circuit board are situated in an exactly coplanar arrangement to each other.

According to an embodiment, the contacts have between their respective connection end and their contact end a guide portion extending within a corresponding seat of the insulating body. This guide portion ensures not only the positioning of the individual contact but also the parallelism of the contacts among each other.

According to another embodiment, the contact carrier is equipped with contacts, the connection ends of which are bent into loop-shape, that is preferably at an angle of more than 180°. In this case, while the thus developed prestress of the free ends of the connection areas of the contacts is overcome, the contacts can be pushed (put) onto the corresponding portions of the insulating body. The free ends of the contacts are partly bend back in the process—against the prestress. As a result, the connect on ends and especially the free ends of the contacts lie upon the outer surface of the contacts carrier in an absolutely flat and coplanar arrangement with each other, and—as explained—project at least a little beyond the contact carrier so that they can be soldered securely to the associated contact strip of the circuit board or they can be fixed to the contacts of the circuit board.

The exact Positioning of the contacts is facilitated in that, according to another embodiment, the surface portions of the insulating body contacting the contacts are at least partially offset in height with regard to adjacent surface portions. For example, this can be carried out by forming corresponding guiding grooves in the insulating body for the contacts, within which the contacts lie, having positive fit.

In principle, the contacts may extend in different manner within and outside of the insulating body. The embodiment represented in the following example describes a contact which is offset like a meander.

Here, the contacts are formed with an abutment between their connection end and their contact end, which acts in the opposite direction to the connection end of the contacts to prevent a relative displacement of the contacts. The abutment may for example be formed by a tongue being cut (punched) from the contact material and extending at an angle to the corresponding contact portion.

Above, it already has been referred to an embodiment in which the connection ends of the contacts are flanged into loop-shape (U-shape). In order to facilitate putting the connection ends onto the corresponding portions of the contact carrier, another embodiment of the invention provides that the portion of the insulating body receiving the connection end of a contact is rounded or flattened on the face. Thereby, putting-on the contact—against the prestress of the contact end—as well as positioning the contact itself is facilitated. This constructive design is also explained in more detail in the following embodiments.

The same result is obtained alternatively or cumulatively by rounding or beveling the free end of the connection ends of the contacts.

On the whole, the result is a contact carrier with an extremely simple construction, which facilitates an exact positioning of the contacts and wherein particularly the connection ends of the contacts are formed in an absolutely coplanar arrangement.

Thus, the described contacts carrier can be placed on the associated circuit board particularly advantageously in the known SMD (SMT) technology. The SMD soldered joint can be carried out compactly also within the contact carrier.

Further characteristics of the invention are shown by the features of the subclaims and the other application documents.

DETAILED DESCRIPTION OF THE PREFERRED EMBODIMENT

Figure 1:
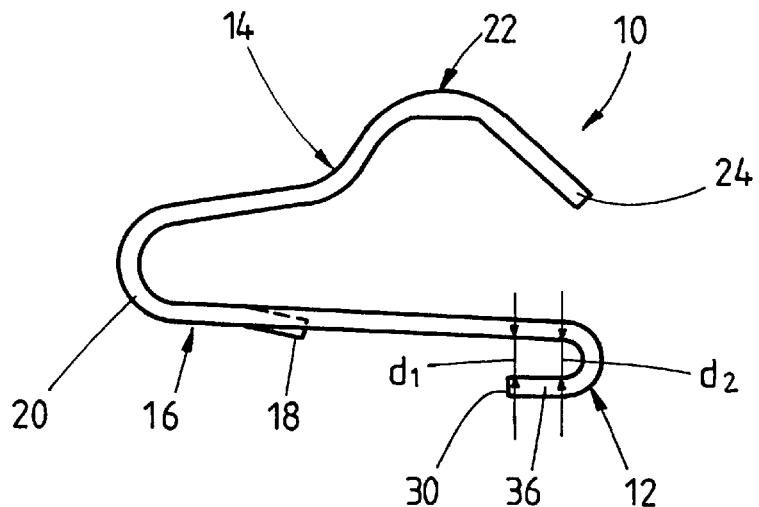
FIG. 1 shows an individual contact for an contact carrier according to the invention in side view.

A contact 10 is illustrated in FIG. 1, which has a connection end 12, a contact end 14 and a guide portion 16 extending between the connection end 12 and the contact end 14.

The connection end 12 is bent into loop-shape, the distance between the corresponding surface portions at the free end 30 (d1) being smaller than in the region of the bend (d2).

A downwardly bent tongue 18 is punched out of the guide portion 16 approximately in the middle of the guide portion 16.

The contact 10 is bent (bend 20) between the guide portion 16 and the contact end 14 in the opposite direction of the connection end 12. The contact end 14 itself extends in wave-like manner under formation of an arched contact surface 22 between the bend region 14 and the free end 24 of the contact end 14.

Figure 2:
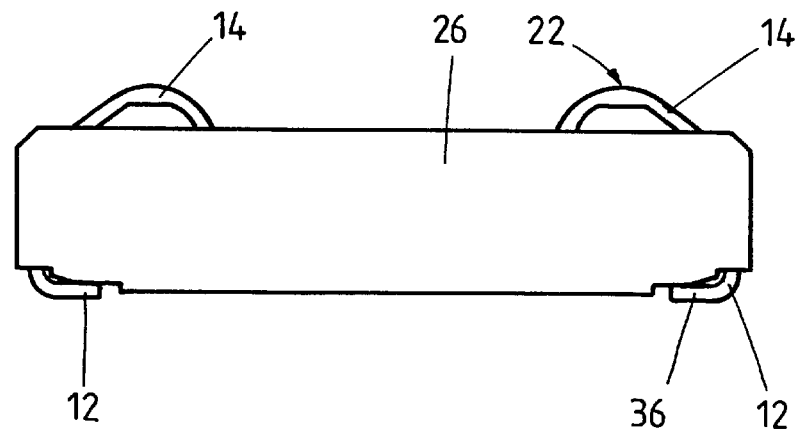
FIG. 2 shows a side view of a contacts carrier equipped with the contacts according to FIG. 1.

A plurality of the contacts 10 being illustrated in FIG. 1 and consisting of an electrically conductive material are disposed in a contact carrier 26 in a side-by-side and parallel relationship, as shown in FIG. 2.

The contacts 10 extend in corresponding recesses (guiding grooves) (not shown) within the contact carrier (termed "insulating body" below) 26 consisting of insulating material.

It can be seen that both the contact surfaces 22 and the connection ends 12 of each contact 10 project beyond the insulating body 26.

Figure 3:
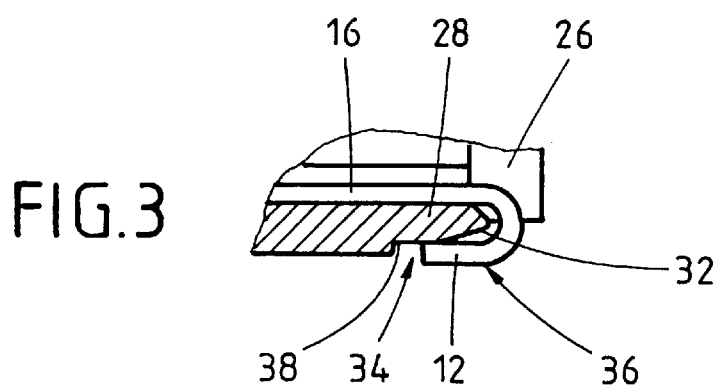
FIG. 3 shows the region between the connection end of a contact and the associated portion of the contact carrier in enlarged representation.

FIG. 3, in enlarged representation, shows the connection area between the connection end 12 and an associated portion 28 of the insulating body 26. It can be seen that the contact 10 with its loop-shaped connection end 12 is put laterally onto the corresponding portion 28. In order to facilitate the putting-on, the portion 28 has a "pointed" shape on the exterior so that the free end of the connection end 12 may be guided along the bevelled surface 32 into an insulating body faced recess, while the prestress of the connection end 12 is overcome, such that the contact surface 36 of the contact 10 extends in exactly parallel arrangement to the bottom 38 of the recess 34. Now is: $d_1=d_2$=thickness of the portion 28. From the identical formation of all the portions 28 for receiving the contacts 10 follows an exactly coplanar arrangement of the contact surfaces 36 of the contacts 10 among each other.

This makes equipping the contact carrier 26 with its contacts 10 on an associated circuit board (not shown with extremely high precision possible. All the contact surfaces 36 of the contacts 10 are situated in an absolutely coplanar arrangement, due to the described fabrication of the contacts 10 in the contact carrier 26.

We claim:

1. A contact carrier including an insulating body (26) and contacts (10) positioned therein, each contact (10) having contact and connection ends (14, 12) projecting beyond the insulating body (26) and the connection ends (12) of the contacts (10) resting under prestress upon corresponding portions (28) of the insulating body (26), while forming flat and coplanar contact surfaces (36), wherein said flat and coplanar contact surfaces are adapted to electrically contact a circuit board.

2. The contact carrier according to claim 1, wherein the contacts (10) have a guide portion (16) between their connection end (12) and their contact end (14), which extends within a corresponding seat of the insulating body (26).

3. The contact carrier according to claim 1, wherein the connection ends (12) of the contacts (10) are bent into a loop-shape.

4. The contact carrier according to claim 1, wherein a face of the portion (28) of the insulating body (26) receiving the connection end (12) of at least one of the contacts (10) is rounded or flattened.

5. The contact carrier according to claim 1, wherein the connection ends (12) are put onto the insulating body (26).

6. The contact carrier according to claim 1, wherein a free connection end of the contacts (10) is rounded or flattened.

7. The contact carrier according to claim 1, wherein surface portions of the insulating body (26) contacting the contacts (10) are at least partially offset from adjacent surface portions of the insulating body (26).

8. The contact carrier according to claim 7, wherein the surface portions of the insulating body (26) contacting the contacts (10) are at least partially formed as guiding grooves in which the contacts (10) are positively fitted.

9. The contact carrier according to claim 1, having an abutment (18) for each contact (10), acting in opposite direction to the connection end (12) of the contacts (10).

10. The contact carrier according to claim 9, wherein the abutments (18) are formed as tongues shaped from the contacts (10).

* * * * *